United States Patent

Berlin

(10) Patent No.: US 6,495,223 B1
(45) Date of Patent: Dec. 17, 2002

(54) LAMINATED PACKAGING MATERIAL, A METHOD OF PRODUCING THE SAME, AS WELL AS PACKAGING CONTAINERS

(75) Inventor: Mikael Berlin, Lund (SE)

(73) Assignee: Tetra Laval Holdings & Finance, SA, Pully (CH)

( * ) Notice: Subject to any disclaimer, the term of this patent is extended or adjusted under 35 U.S.C. 154(b) by 0 days.

(21) Appl. No.: 09/077,935
(22) PCT Filed: Dec. 18, 1996
(86) PCT No.: PCT/SE96/01681
§ 371 (c)(1), (2), (4) Date: Jun. 10, 1998
(87) PCT Pub. No.: WO97/23390
PCT Pub. Date: Jul. 3, 1997

(30) Foreign Application Priority Data

Dec. 21, 1995 (DK) .............................. 1451/95

(51) Int. Cl.⁷ ........................ B29C 47/06; B32B 31/12
(52) U.S. Cl. .................... 428/34.2; 428/34.3; 428/36.6; 428/511
(58) Field of Search ............... 428/35.6, 35.7, 428/473, 511, 34.2, 34.3, 36.6

(56) References Cited

U.S. PATENT DOCUMENTS

| | | | |
|---|---|---|---|
| 4,708,947 A | * | 11/1987 | Maruyama et al. ......... 503/209 |
| RE33,376 E | * | 10/1990 | Gibbons et al. ............ 428/34.2 |
| 5,380,586 A | | 1/1995 | Knoerzer et al. ............ 428/349 |
| 5,487,940 A | | 1/1996 | Bianchini et al. ........... 428/349 |
| 5,508,113 A | | 4/1996 | Knoerzer .................... 428/500 |
| 5,512,338 A | | 4/1996 | Bianchini et al. .......... 428/35.4 |
| 5,547,764 A | | 8/1996 | Blais et al. ................. 428/461 |
| 5,604,042 A | | 2/1997 | Bianchini et al. ........... 428/507 |
| 5,658,622 A | * | 8/1997 | Berlin et al. ............... 428/34.2 |
| 5,897,960 A | * | 4/1999 | Oba et al. ................... 428/532 |

FOREIGN PATENT DOCUMENTS

| | | | |
|---|---|---|---|
| EP | 265561 B | * | 4/1989 |
| EP | 0590263 A2 | * | 4/1994 |
| EP | 0590263 | | 4/1994 |
| JP | 62053831 A | * | 3/1987 |
| JP | 01066204 A | * | 3/1989 |
| JP | 04028746 A | * | 1/1992 |
| WO | WO 96/27624 | * | 9/1996 |
| WO | 9627624 | | 9/1996 |

* cited by examiner

Primary Examiner—Sandra M. Nolan
(74) Attorney, Agent, or Firm—Welsh & Katz, Ltd.

(57) ABSTRACT

A laminated packaging material for liquid-tight, dimensionally stable packages has superior gas-barrier properties, particularly oxygen barrier properties. The laminated packaging material includes a core layer and a barrier layer juxtaposed to the core layer. The barrier layer is formed from a polyvinyl alcohol, a polysaccharide and a cross-linking agent, the polysaccharide being chitosan and the cross-linking agent being a dialdehyde compound. A method for making the laminated packaging material is also disclosed.

16 Claims, 1 Drawing Sheet

Figure 1:
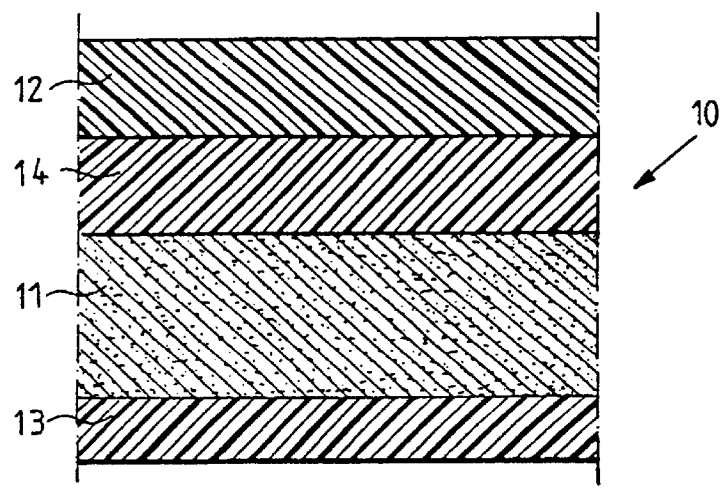

LAMINATED PACKAGING MATERIAL, A METHOD OF PRODUCING THE SAME, AS WELL AS PACKAGING CONTAINERS

TECHNICAL FIELD

The present invention relates to a laminated packaging material comprising a core layer and a layer of cross-linked polyvinyl alcohol applied on one side of the core layer and acting as gas barrier. The present invention further relates to a method of producing the laminated packaging material, as well as to packaging containers produced from the laminated packaging material and possessing superior tightness properties vis-à-vis liquids and gases, in particular oxygen gas.

BACKGROUND ART

Within packaging technology, use has long been made of packages of the disposable type (so-called single use packages) for packing and transporting products such as, for example, liquid foods.

A predominant group of these single use disposable packages is produced from a laminated packaging material which comprises a core layer of paper or paperboard and outer, liquid-tight coatings of plastic, preferably polyethylene, on both sides of the core layer.

The point of departure and prime object of the composition of the packaging material is to impart to the package the best possible mechanical and chemical product protection properties for the packed product, at the same time as making possible simple and rational production of the package. A core layer of paper or paperboard imparts to the package the requisite mechanical configurational stability so that the package can be conveniently handled in a rational distribution system, while the outer plastic coatings efficiently protect the liquid-absorbent fibre layer against penetration of moisture and liquid which otherwise would rapidly render the package sloppy and unusable. If the outer liquid-tight plastic coatings consist of polyethylene, the advantage is also afforded that the laminated packaging material is given excellent heat-sealing properties such that a package may be permanently given its desired geometric configuration by conventional heat sealing technology during conversion of the laminated packaging material into finished packages.

A laminated packaging material consisting solely of paper or paperboard and plastic as described above thus makes for a rational production of configurationally stable, liquid-tight packages, but however lacks tightness properties vis-à-vis gases, in particular oxygen gas and must therefore be supplemented with such gas tightness properties in order to be usable for packages for oxygen gas-sensitive products such as, for example, foods.

It is known in the art to supplement the described paper or paperboard material with a foil of aluminum (so-called Alifoil) which serves as a gas barrier and is applied on the one side of the core layer between the core layer and the one outer liquid-tight plastic coating of the laminated packaging material. An intact Alifoil is practically completely gas tight, but because of the slight (or non-existent) extensibility and ductility of the Alifoil, there is a risk that the once applied Alifoil cracks in particularly exposed areas of the packaging material when this, by fold formation, is reformed into finished packages. In addition, Alifoil is relatively expensive to produce and is therefore a major contributory factor in greatly increasing the material and production costs of the laminated packaging material.

By way of alternative to the above-described Alifoil it is also known in the art to employ as gas barrier polymers of the barrier polymer type in paper or paperboard materials as described above. One among numerous known examples of such alternative barrier polymers possessing superior gas tightness properties is polyvinyl alcohol which, like the Alifoil, is applied on one side of the core layer between the core layer and the one outer liquid-tight plastic coating of the laminated packaging material.

Compared with an Alifoil, polyvinyl alcohol possesses several valuable properties which render polyvinyl alcohol particularly attractive as an alternative material to the Alifoil. First, it is considerably cheaper than an Alifoil, and further, a layer of polyvinyl alcohol is more ductile and extensible and therefore less crack-sensitive than the Alifoil. Polyvinyl alcohol possesses good gas tightness properties, in particular oxygen gas tightness properties, fully on a par with an Alifoil, at the same time as polyvinyl alcohol (as opposed to an Alifoil) is an approved and licensed material in food contexts and may, therefore, be used without legal hindrance in direct contact with foods.

One serious drawback inherent in polyvinyl alcohol is, however, that it is moisture-sensitive and rapidly loses its valuable gas-tightness properties if it is exposed to the effects of moisture.

The problem of polyvinyl alcohol's moisture sensitivity is solved according to one prior art proposal in that the polyvinyl alcohol layer applied as the gas barrier is encapsulated or enveloped between surrounding liquid-tight plastic coatings which efficiently protect the interjacent polyvinyl alcohol layer against penetration by moisture and wet from both sides of the laminated packaging material. The application of such protective layers renders not only the overall structural build-up of the laminated packaging material more complex but also the method of producing the laminated packaging material, in that it requires at least one additional coating stage with associated coating equipment for applying these protective coatings.

According to another prior art method, the moisture sensitivity problems inherent in polyvinyl alcohol are solved by a chemical modification of the polyvinyl alcohol using chemical cross-linking agents with whose help the polyvinyl alcohol is chemically cross-linked for the formation of a cross-linked, water-resistant polyvinyl structure which withstands the action of moisture better than the pure polyvinyl alcohol without losing any gas barrier properties. Examples of such known cross-linking agents may be dialdehyde compounds (e.g. glyoxal) and acid anhydrides. Amongst other things, this prior art technology enjoys the advantage over and above the previously described encapsulation technique in that it makes for a simple production of the laminated packaging material without the need for additional application stages, at the same time as the thus produced packaging material displays a simpler material structure (fewer material layers) than the encapsulated material structure as described above. However, the problem inherent in this known chemically modified material structure is that the cross-linked polyvinyl alcohol layer is relatively rigid and unbending and therefore runs the risk, as in the known Alifoil structure, of cracking or rupturing in particularly exposed areas of the packaging material when this is reformed into finished packages.

OBJECTS OF THE INVENTION

One object of the present invention is therefore to obviate the above-described drawbacks in the prior art laminated packaging materials.

A further object of the present invention is to realise an improved laminated packaging material of the type described by way of introduction, without complicated material structure, as in the known packaging material employing an encapsulated polyvinyl alcohol layer.

Still a further object of the present invention is to realise a moisture and water-resistant polyvinyl alcohol material which may readily be reformed into liquid-tight, dimensionally stable packages possessing superior gas barrier properties, in particular superior oxygen gas barrier properties, without the risk of crack formation and other breaches in tightness in the cross-linked polyvinyl alcohol layer.

Solution

These and other objects and advantages will be attained according to the present invention by means of a laminated packaging material possessing the characterizing features as set forth in appended claim 1.

Expedient and practical embodiments of the laminated packaging material according to the invention have further been given the characterizing features as set forth in the claims.

Outline of the Invention

The combination of polyvinyl alcohol, chemical cross-linking agent and polysaccharide in the polyvinyl alcohol layer realises, according to the invention; a cross-linked polyvinyl alcohol structure which, through the chemical cross-linking, is water-resistant and which, at the same time as a result of the incorporation of the polysaccharide, is sufficiently flexible to be bendable without the risk of crack formation as a result of structural rigidity.

One preferred example of such a usable polysaccharide is chitosan, while examples of applicable chemical cross-linking agents may be conventional dialdehyde compounds, for example glyoxal and acid anhydrides.

The mixing ratio between polyvinyl alcohol and polysaccharide in the polyvinyl alcohol layer is between 99:1 and 50:50 on a weight basis, preferably, between 90:10 and 70:30.

The mixing ratio between the chemical cross-linking agent and the combination of polyvinyl alcohol and polysaccharide is between 99:1 and 50:50 on a weight basis.

The polyvinyl alcohol which is employed in the laminated packaging material according to the present invention should have a hydrolysis degree of at least 70 per cent, such as for example between 90 and 100 per cent.

In order to render the laminated packaging material according to the present invention readily convertible by fold forming and heat sealing into liquid-tight dimensionally stable packages, the packaging material is provided with outer, liquid-tight coatings of plastic, preferably thermoplastic, such as polyethylene, whereby the laminated packaging material may be sealed by conventional heat sealing techniques using existing equipment.

According to the present invention, the core layer may be a fibre-based material, such as paper or paperboard, or consist of plastic, such as polyolefin, polyester, polyamide etc.

According to a further aspect of the present invention, there will be realised a simple method of producing the laminated packaging material using existing production techniques and equipment. The method according to the present invention has the characterizing features as set forth in appended claim 13. Expedient and advantageous embodiments of the method according to the present invention have further been given the characterizing features as set forth in several of the claims.

According to yet a further aspect of the present invention, there will be realised a liquid-tight, dimensionally stable packaging container which has the characterizing features as claimed below.

BRIEF DESCRIPTION OF THE ACCOMPANYING DRAWING

Figure 2:
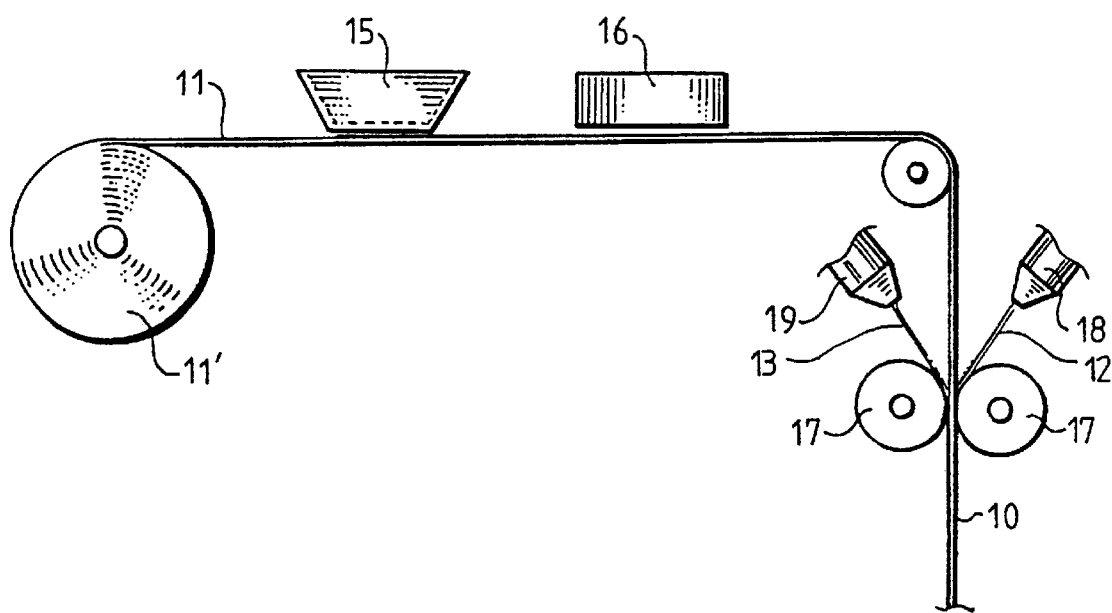

The present invention will now be described and explained in greater detail hereinbelow, with particular reference to the accompanying Drawing, in which:

FIG. 1 schematically shows a cross section of a simple but nevertheless functional embodiment of the laminated packaging material according to the invention; and FIG. 2 schematically illustrates a method of producing the laminated packaging material according to the invention.

In order to avoid the risk of any possible misunderstanding, it should first be observed that the packaging material structure illustrated in FIG. 1 is by no means intended to restrict the scope of the invention, but is merely intended to show one version of a material structure according to a greatly simplified embodiment of the invention. Thus, the number of individual layers need not be exactly four, as shown, but the layers may be both greater and fewer in number without departing from the spirit and scope of the inventive concept as herein disclosed.

DESCRIPTION OF PREFERRED EMBODIMENT

FIG. 1 thus schematically shows a cross section of a laminated packaging material according to the present invention, carrying the generic reference numeral 10.

The packaging material 10 has a core layer 11 of fibre-based material or of other material, for example plastic. Examples of usable fibre-based materials for the core layer 11 may be paper or paperboard of conventional packaging quality, while examples of usable plastics may be polyolefin, eg. polyethylene, polypropylene and copolymers of ethylene and propylene, polyester, polyamide etc. In such cases in which the core layer 11 consists of a plastic, the core layer may display a homogeneous, solid structure or be of foamed or expanded material structure. Without departing from the inventive concept as herein disclosed, the plastic may also include fillers admixed into the plastic, if desired.

On both sides of the core layer, there are disposed outer liquid-tight coatings 12 and 13 of plastic which preferably but not necessarily consist of an extrudable thermoplastic, preferably polyethylene. The choice of an extrudable thermoplastic, such as polyethylene, for both of the outer plastic coatings 12 and 13 renders the laminated packaging material 10 particularly easy to produce, at the same time as the laminated packaging material becomes sealable in such a manner that mutually facing plastic coatings may readily be sealed to one another by surface fusion by means of conventional heat sealing techniques, as a person skilled in this art will already be aware.

Between the core layer 11 and the one outer, liquid-tight plastic coating 12, the laminated packaging material 10 is provided with a layer 14 of polyvinyl alcohol serving as the gas barrier, in particular oxygen gas barrier, this layer also including a polysaccharide and a chemical cross-lining agent for the purposes of rendering the polyvinyl alcohol layer 14 both pliable and readily formable as well as water-resistant.

The choice of polysaccharide in the gas barrier layer 14 may vary, but one polysaccharide that has proved to be particularly useful in the present invention is of the type chitosan. In particular, it has proved that chitosan of a viscosity of over 70 cP at 1 per cent concentration contributes in imparting to the laminated packaging material 10 low oxygen gas permeability, at the same time as mixture including such a chitosan is particularly simple to apply to paper or paperboard by a coating operation. According to the present invention, chitosan is therefore selected of viscosities varying between 70 and approx. 1000 cP as the above-disclosed polysaccharide in the gas barrier layer 14 of the laminated packaging material 10.

The choice of chemical cross-linking agent in the gas barrier layer 14 may also vary, but suitably such cross-linking agents are selected from among already known cross-linking agents in this field. Examples of known, usable chemical cross-linking agents may be dialdehyde compounds, for example glyoxal, and acid anhydrides.

According to one preferred embodiment, the gas barrier layer 14 contains polyvinyl alcohol, polysaccharide and chemical cross-linking agent in such a mixing ratio that the relationship between the chemical cross-linking agent and the combination of the polyvinyl alcohol and polysaccharide is between 99:1 and 50:50, on a weight basis. Furthermore, the relationship between the polyvinyl alcohol and polysaccharide in this mixture should be between 99:1 and 50:50, preferably between 90:1 and 70:30, on a weight basis.

The polyvinyl alcohol in the gas barrier layer 14 may be any optional polyvinyl alcohol quality from very low viscosity (such as 3 cP at 4 per cent concentration) to high viscosity (such as 100 cP at 4 per cent concentration). The hydrolysis degree of the polyvinyl alcohol may be from 70 per cent to 100 per cent, preferably 90 per cent and higher in view of the gas barrier.

The illustrated packaging material 10 in FIG. 1 may, according to the present invention, be produced in the manner that is schematically illustrated in FIG. 2, in which, for purposes of clarity, the same reference numerals as in FIG. 1 have been employed for identical or corresponding parts.

A web 11 of paper or paperboard (or alternatively of plastic) is unwound from a magazine reel 11' and is led past an applicator 15 (preferably a coating apparatus of conventional type) disposed adjacent the web, and with the aid of which an aqueous solution or dispersion of polyvinyl alcohol, polysaccharide and chemical cross-linking agent is applied by a coating operation onto one side of the web 11 in the form of a continuous layer 14. The applied quantity of the aqueous solution or dispersion may vary, but preferably the aqueous mixture is applied in such a quantity that a well-integrated, continuous layer 14 is formed after drying, eg. a grammage of 1–10 g/m$^2$.

The web 11 is led further past a drying apparatus 16 acting on the coated side of the web 11, for example an infrared drier, or a hot air device for driving off water and drying the applied layer 14.

The coated, dried web 11 is finally led through the nip between two rotary rollers 17, at the same time as thin plastic films 12 and 13 of preferably polyethylene are extruded on both sides of the web with the aid of extruders 18 and 19, for the formation of the laminated packaging material 10 as shown in FIG. 1.

From a sheet or web-shaped packaging material according to the present invention which, in a per se known manner, is provided with fold-facilitating crease lines, decorative artwork etc., liquid-tight, dimensionally stable packaging containers are produced in a per se known manner using conventional packaging machines of the type which form, fill and seal finished packages. From, for example, a web of the packaging material, packages are produced in that the web is first reformed into a tube by both longitudinal edges of the web being united to one another by means of heat sealing in a so-called overlap joint seam. The tube is filled with the pertinent contents and is divided into individual packages by repeated transverse sealing of the tube transversely of the longitudinal axis of the tube and beneath the level of contents in the tube. The packages are separated from one another by incisions or cuts in the transverse sealing zones and are given the desired geometric final form, normally parallelepipedic, by an additional fold formation and heat sealing operation for the formation of the finished, filled and sealed packaging containers.

It will thus have been apparent from the foregoing description that the present invention, in a simple manner and using simple, existing means, attains the previously outlined objects and realises a simple but effective laminated packaging material for a packaging container possessing superior gas barrier properties, without the risk of crack formation or other breaches in tightness, as a result of material rupture in the gas barrier layer, during reforming of the laminated packaging material into packages, as is the case in the similar, prior art packaging materials.

While the present invention has been described with particular reference to the material structure shown on the Drawing, it will be obvious to the skilled reader of this specification that various modifications and alterations may be put into effect without departing from the spirit and scope of the inventive concept as herein disclosed. Such modifications and alterations obvious to a person skilled in the art are hence encompassed by the inventive concept as defined in the appended Claims.

What is claimed is:

1. A flexible laminated packaging material comprising:
   a core layer made of paper, paperboard or a mixture thereof; and
   a gas barrier layer juxtaposed to the core layer, the gas barrier layer comprising polyvinyl alcohol, chitosan and a dialdehyde crosslinking agent wherein the chitosan is one whose 1% aqueous solution has a viscosity over 70 centipoise.

2. The laminated packaging material according to claim 1 wherein the weight ratio between polyvinyl alcohol and polysaccharide in the barrier layer is between 90:10 and 50:50.

3. The laminated packaging material according to claim 1 wherein the weight ratio between the cross-linking agent and the combination of polyvinyl alcohol and polysaccharide is between 99:1 and 50:50.

4. The laminated packaging material according to claim 1 wherein the polyvinyl alcohol in the barrier layer has a hydrolysis degree of at least 70 per cent.

5. The laminated packaging material according to claim 1 further comprising a first outer coating of plastic and a second outer coating of plastic.

6. The laminated packaging material according to claim 1 wherein the barrier layer is surrounded by moisture-protective plastic layers.

7. The laminated packaging material according to claim 1 wherein the core layer comprises paperboard.

8. A method of producing a flexible laminated packaging material, comprising the steps of:
   providing a web of a core layer made of paper, paperboard or a mixture thereof;
   applying a solution comprising polyvinyl alcohol, chitosan and a dialdehyde crosslinking agent to a surface of the core layer to produce a coated web; and drying the coated web wherein the chitosan is one whose 1% aqueous solution has a viscosity over 70 centipoise.

9. The method according to claim 8 further comprising extruding a first and second layer of plastic onto the dried web.

10. The method according to claim 8 further comprising extruding a plastic layer onto the first surface of the core layer prior to applying the solution.

11. The method according to claim 10 further comprising extruding a plastic layer onto the coated surface of the dried web.

12. The method according to claim 8 wherein the weight ratio between polyvinyl alcohol and polysaccharide in the barrier layer is between 90:10 and 50:50.

13. The method according to claim 8 wherein the weight ratio between the cross-linking agent and the combination of polyvinyl alcohol and polysaccharide is between 99:1 and 50:50.

14. The method according to claim 8 wherein the polyvinyl alcohol in the barrier layer has a hydrolysis degree of at least 70 per cent.

15. A flexible container for a flowable food product, which container comprises:

a core layer made of paper, paperboard or a mixture thereof and a gas barrier layer juxtaposed to the core layer, the gas barrier layer comprising polyvinyl alcohol, chitosan and a dialdehyde crosslinking agent wherein the chitosan is one whose 1% aqueous solution has a viscosity over 70 centipoise.

16. The container according to claim 15 wherein the weight ratio between polyvinyl alcohol and polysaccharide in the barrier layer is between 90:10 and 50:50.

* * * * *